Dec. 1, 1942.   S. KRASNOW   2,303,845
APPARATUS FOR THE MEASUREMENT OF GRAVITY
Filed Nov. 15, 1937   2 Sheets-Sheet 2
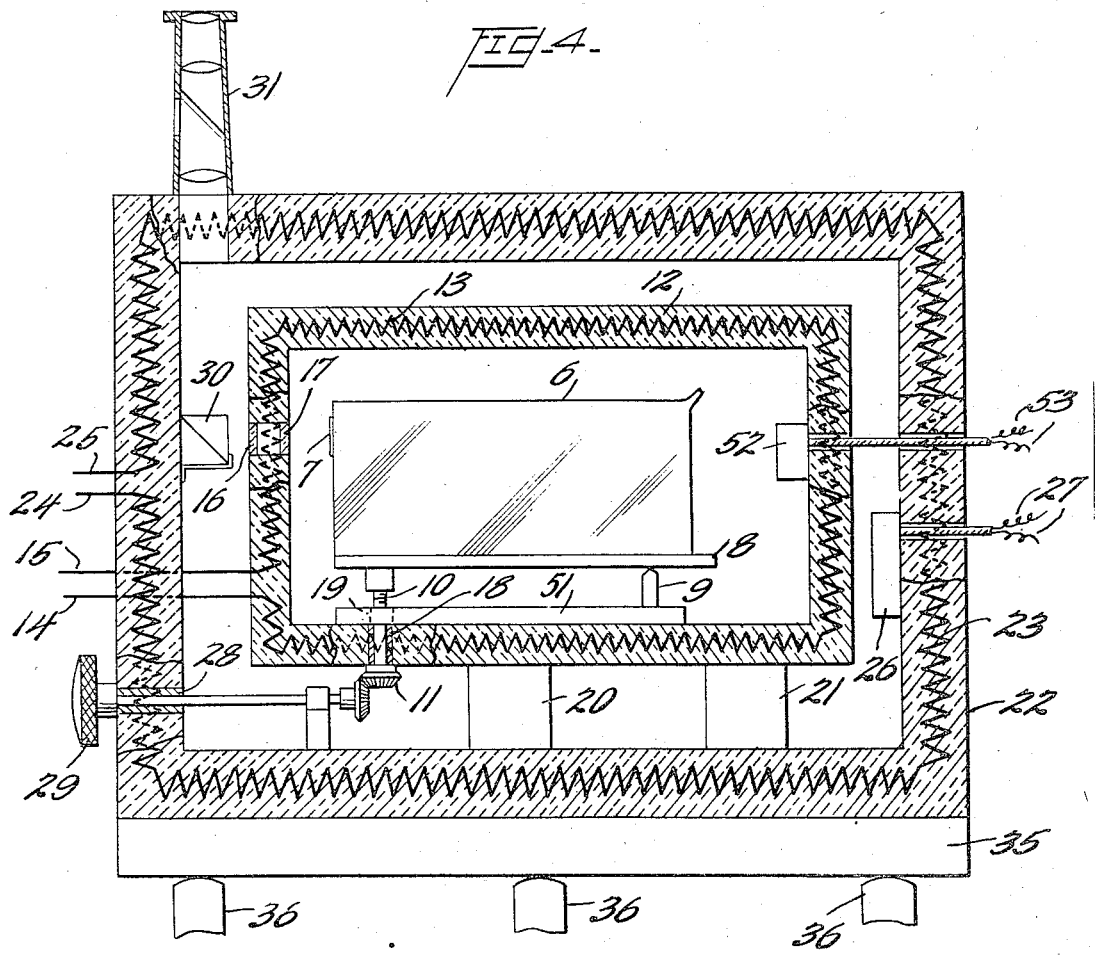
FIG-4-
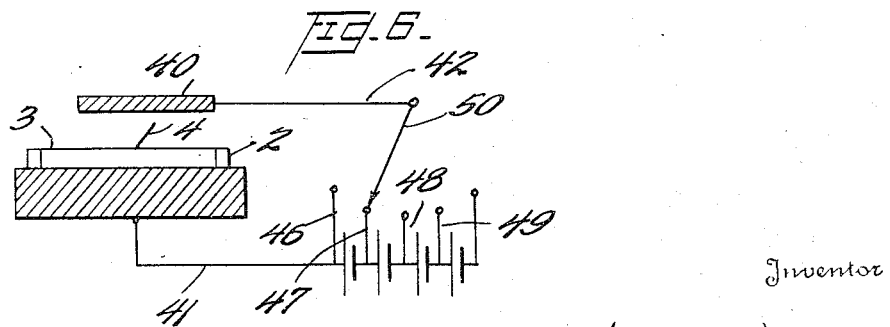
FIG-5-
Inventor
Shelley Krasnow Patented Dec. 1, 1942

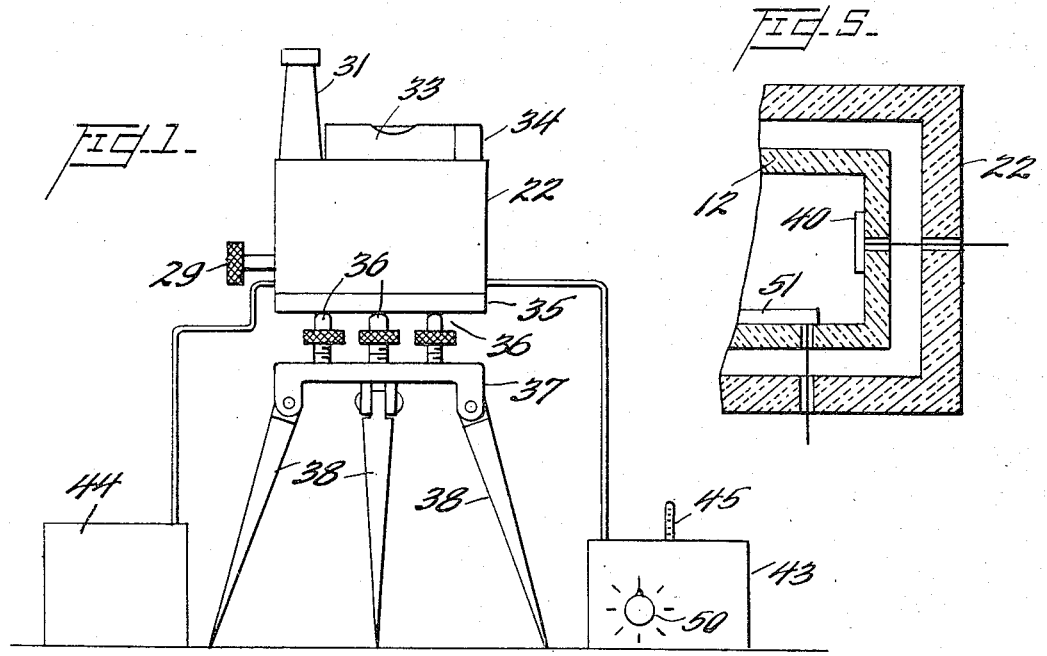
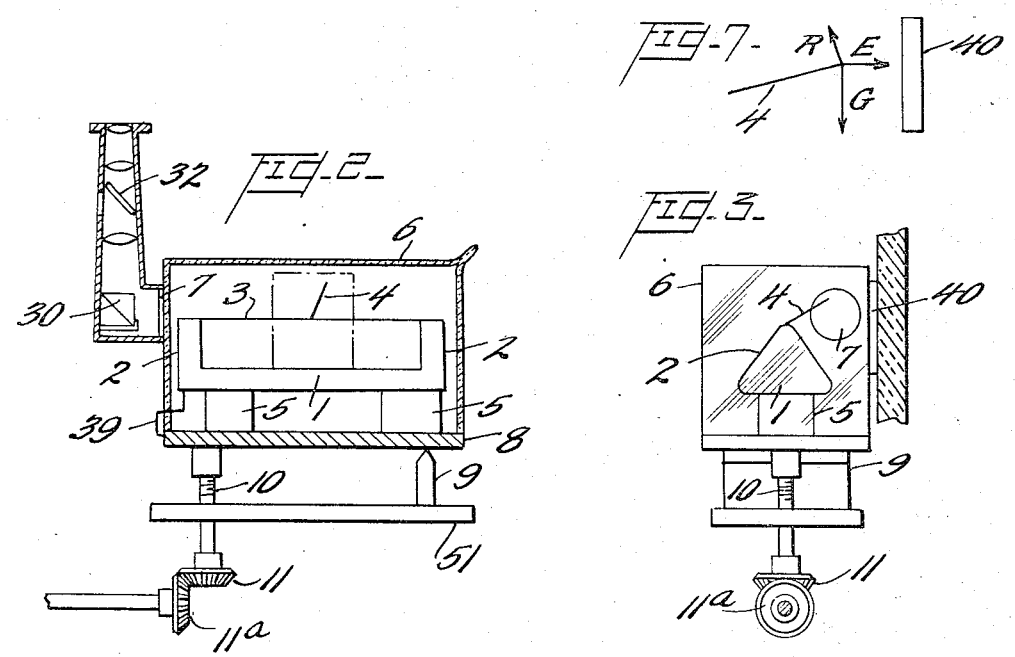

2,303,845

UNITED STATES PATENT OFFICE 2,303,845

APPARATUS FOR THE MEASUREMENT OF GRAVITY

Shelley Krasnow, New York, N. Y.

Application November 15, 1937, Serial No. 174,678

6 Claims. (Cl. 265—1.4)

This invention relates to a new method and apparatus for making precise measurements of gravity on the earth's surface. It is a function of the invention to provide a readily portable means for making such measurements conveniently and accurately. It is a further object of the invention to provide a temperature controlling system to obviate difficulties due to temperature changes in the apparatus.

It is a further object of the invention to provide a pendulum apparatus which will have an electrical control system permitting greater sensitivities than have heretofore been possible. Reference is had to the accompanying drawings in which:

Figure 1 shows an external view of the apparatus, set up for normal field observation.

Figure 2 shows a side view of the sensitive element of the apparatus, showing the tilting and observing systems.

Figure 3 shows an end view of the sensitive element.

Figure 4 shows a cross-sectional view of the apparatus.

Figure 5 shows some of the electrical elements of the apparatus.

Figure 6 shows the electrical circuit of the apparatus.

Figure 7 shows schematically the theory of operation of the apparatus.

In geological work, and in prospecting for deposits of ores and petroleum, it has been found highly useful to make a number of very precise measurements of the earth's gravity at a series of selected points. By the change in gravity from point to point, very valuable information can be had as regards the underground structure, thus aiding the geologist or prospector in forming his conclusions.

Apparatus formerly employed for this purpose had the disadvantage of "zero drift," that is, the instrument used would continually change its reading with time for the same value of gravity. This had made necessary a number of checking operations which proved very costly in prospecting work. With such instruments, it is necessary to reoccupy a base station at intervals throughout the work in an area, to measure the amount of drift that had occurred in the instrument.

A number of different types of apparatus have been developed, which obviate this difficulty. However, they are not capable of the precision required in this type of work. It is frequently necessary to know the value of gravity at a point to within one part in 10 million. As far as the inventor is aware, no present instrument, aside from that described herein, free of the "zero drift," will measure to this precision.

It is understood that most instruments which attempt to measure gravity by the accurate measurement of the deformation of an elastic element by a weight, will be expected to assume a definite deformation for every value of gravity, and to reproduce this same deformation for each respective value of gravity, at any time that the measurement is repeated. In practice this is not found to hold. The elastic element will undergo changes due to time, which are not related in any way to the external forces caused to operate on it. This defect is known as "creep" or "zero drift."

The mode of operation, and the advantages of the instant invention will be seen from the description below.

I shows a fork shaped frame which is preferably made of quartz to reduce temperature effects. Stretched across the two jaws 2, 2 of this frame is a torsion fibre 3, which is also preferably made of quartz to reduce temperature effects. Fixed to the middle of the fibre 3 is an inverted pendulum or needle 4, which consists merely of a short piece of quartz fibre which may be of somewhat larger diameter than that of the fibre 3. The fibres 4 and 3 are preferably "spattered" with a conducting film, which serves the double purpose of reducing temperature effects and allowing electrification of the member 4. The frame 1 may also be coated with conducting material to aid in conducting electricity to the fibre 3, and to reduce temperature effects within its own body. The frame 1 is cemented to blocks 5, 5 which rest on the bottom of a vessel 6. This vessel may be of transparent material or may be of opaque material with an observation window at 7. The vessel is evacuated to reduce the effects of temperature changes. The vessel 6 is in turn cemented to a sub-base 8 which may be of metal. This base rests upon a knife-edge 9 and on the end of a fine thread screw 10. The screw 10 is moved through the intermediacy of bevel gears 11 and 11a. It is thus seen that the housing 6 may be rotated about the knife-edge 9 by any desired small amount. The member 6, together with members 9 and 10 rest upon a base 51 which is in turn placed within the enclosure 12. This enclosure has within its walls an electrical heating wire 13 with terminals 14 and 15. It is further provided with an observation window composed of transparent plates 16 and 17 having an air space between them. The shaft 18, operating the screw 10, passes through a bushing 19 in the housing 12. The housing 12 is further mounted upon blocks such as 20 and 21, which latter rest within an outer enclosure.

The enclosure 22 has within its walls an electrical heating wire 23 with terminals 24 and 25. Mounted within enclosure 12 is a temperature sensitive element 52 with wires 53, 53 leading through the walls of enclosures 12 and 22 to the outside. There is a similar temperature sensitive element 26 mounted within enclosure 22 and which has wires 27, 27 leading outside. The horizontal shaft bearing bevel gear 11a passes through the bushing 28 in housing 22 and has at its end a knob 29 to operate the said bevel gears. Mounted within enclosure 22 is a prism 30 which serves to bring light in both directions through windows 16 and 17 and so into enclosure 6. A microscope tube 31 has mounted within it lenses of the conventional type, and a reflecting plate 32 to cause light to be reflected downward into prism 30 and so into enclosure 6. This serves for illumination for the interior of enclosure 6. Mounted on enclosure 22 are a pair of levels 33 and 34 at right angles to each other, to indicate when the apparatus has been correctly leveled. The enclosure 22 is mounted upon a base plate 35 which in turn rests on leveling screws 36, 36, 36. The latter rest upon a base 37 and conventional tripod legs 38, 38, 38 are fastened to it. A lead wire 39 leads from the frame 1 of the apparatus through the walls of enclosures 6, 12, and 22 and so to the outside, and a wire leads from a conducting plate 40 through insulating members in the walls of enclosures 12 and 22 and so also to the outside. The leads from 39 and 40, which are respectively designated as 41 and 42, are brought to an enclosure 43, the purpose of which will be hereinafter described. The leads from the temperature sensitive elements 26 and 52 and leads 24, 25, 14 and 15 are all brought to an electrical temperature regulating system. One of the systems, that provided for enclosure 12, is so designed as to maintain a constant temperature to within very close limits, preferably 0.01% C. The temperature sensitive element 26 is so connected to relays within the temperature regulating system as to maintain a temperature constant to within preferably 0.1% C. It is seen that by keeping the outside enclosure to a nearly constant temperature, it will be comparatively easy to control the temperature of the inner enclosure to within a still lesser amount. The temperature control apparatus is shown schematically as 44.

The member 43 contains a source of standard voltage. This may be a very accurate potentiometer, or preferably an assemblage of standard cells having a very accurately known voltage. These cells are designated as 46, 47, 48, 49 respectively. A range switch 50 serves to control the number of cells in series whose voltages are applied across the leads 41 and 42. In this way a very precise known voltage may be applied within the apparatus. A thermometer 45 indicates the temperature within the enclosure 43 and so allows for correction of the voltage for changes due to temperature.

The operation of the apparatus may be described as follows:

The temperature control apparatus is first connected and allowed to bring the temperature within the apparatus to a known stable value. The apparatus is set up on the tripod 37 on legs 38 and leveled by means of adjusting screws 36, 36, 36, till the levels 33 and 34 indicate that the proper degree of leveling has been accomplished. If the length of needle 4 has been properly adjusted, it will tip over as shown in Figure 3, thereby twisting the fibre 3. However, in operation, the conditions should be such that instability will not result and cause the needle to drop downwards. The needle 4 should preferably be made a little too long, which will cause it to be somewhat over-sensitive. This latter condition can be adjusted by turning screw 10 which will tilt the frame 1 and so decrease the sensitivity of the system consisting of the needle 4 and fibre 3. It will be seen that the effect of the force of gravity on the needle 4 will be lessened as the screw 10 is moved upwards. On the other hand, the strength of the restoring force due to the fibre 3 will remain unchanged for a change in position. As a further control on the needle, the plate 40 can be electrified with respect to the needle 4, by means of the cells 46, 47 etc. The effect of the electrification will be to attract the needle as shown in Figure 7, in which the vector E represents the force due to electrification, the vector G represents the force due to gravity and the vector R represents the restoring force due to the fibre. It is seen that by changing E, which can be done by switch 50, a number of different positions of the needle will be had for the same force of gravity. It will further be seen that a very great change of E is necessary to effect a small change in position of the needle 4, as compared with the change of position due to change in G. This means that the value of E, or in other words, of the voltage due to the batteries, need be known to a lesser degree of precision than the value of G. Since the value of the voltage of a standard cell may be easily known to within one part in 100,000, it should be easily possible to measure G to within 100 times this precision, providing no disturbing effects enter. It will be obvious that this can be done, when one considers that the effect of the electric force can be made $1/100$ that of the effect of gravity. An error in the value of the electric force will therefore introduce an error of $1/100$ its magnitude in the final reading. In operation, the switch 50 would be placed in a number of different positions, and a reading taken for each position. A number of simultaneous equations can then be set up from which the value of the restoring force R can be eliminated, and the value of G known. Each of these equations will be an observation equation of the type very familiar to those versed in physical measurements. A discussion of such equations and the mode of their application will be found in the publication entitled "Calculus of Observation" by Whittaker and Robinson. It is to be observed that the change in voltage caused by operating switch 50 will cause a change in reading of the position of the needle 4. At the same time the observer need only watch the needle, any mechanical shock due to handling of the apparatus being eliminated. It is understood that the position of the needle 4 may be read by any well-known means, such as by comparing its position with that of the lines on a reticule placed within the observing system.

Certain modifications may be made in the apparatus described without departing from the spirit of the invention. Thus, the frame 1 and fibres 3 and 4 may be made of any material having a small coefficient of expansion, or a coefficient very accurately known with temperature. Examples of substitutes for the material quartz described herein, are metals such as Invar, and glass. If the latter is used, it is well to use a glass with a low coefficient of expansion such as "Pyrex." It is understood that any non-conducting material such as glass would require "spattering" just as in the case of the material quartz.

It is further seen that the enclosure 43, may be provided with a temperature control apparatus, similar to that provided for the enclosures 12 and 22.

The temperature control arrangement shown, may be applied to any precise apparatus for the measurement of gravity, in which an elastic element, or an element whose length must be very accurately known, is used. In cases such as the above, it will be seen that a relatively small change in temperature will cause a considerable change in the reading, and thus mask the small differences in value of gravity being sought.

It will be seen that in the present invention, there should be little or no "zero drift." During transportation the voltage across the elements 4 and 40 can be reduced to zero, or a voltage of such sign applied to cause the needle to stand upright, and thus leave the torsion fibre substantially free of any torsional stress. As is well recognized in the electrostatic art, a repulsive force may be obtained between the needle and the plate by making them of the same polarity relative to their surroundings. There should thus be no tendency for any "creep" to take place within the fibre. The reading will depend practically entirely on the torsional elastic modulus of the fibre 3, the force of gravity, and the electrostatic force due to the cells in apparatus 43.

It can be seen that other forces, such as magnetic forces, may be applied to a needle 4, the latter suitably covered with magnetic material, to serve in place of the use of electrostatic forces disclosed.

I claim:

1. In an apparatus for the measurement of gravity, a frame, a torsion fiber, and a weight member, the weight member being made of a material which is an electrical insulator, and which has a low coefficient of expansion, the said member being coated with an electrical conducting film so as to allow the conduction of an electrical potential thereto, means connecting the said member to a source of electrical potential, a conducting plate, and means for applying a potential difference between the said weight member and said conducting plate so as to cause an electrostatic force therebetween.

2. In an apparatus for the measurement of gravity, a forked frame having prongs, a torsion fiber, stretched between the prongs of the said frame, and a weight member mounted upon the said fiber so as to be responsive to the force of gravity and the elastic force due to the fiber, the fiber being rigidly attached to each prong of the frame, an electrostatic element placed proximate to the weight member so as to exert an electrostatic effect thereon, the entire frame being capable of accurate angular rotation about a horizontal axis, at least one of the aforesaid elements being made of quartz so as to reduce temperature effects thereon, further being coated with a layer of conducting material, serving to reduce further the effect of temperature and to provide a conducting path for electricity, the aforesaid combination of elements providing means for the measurement of gravity, relatively unaffected by temperature changes, the electrostatic means serving to attract the weight member to make possible an accurate comparison of the gravity force with the electric force.

3. In an apparatus for the measurement of gravity, a forked frame having prongs, a torsion fiber, stretched between the prongs of the said frame, a weight member mounted upon the said fiber so as to be responsive to the force of gravity and the elastic force due to the fiber, the fiber being rigidly attached to the prongs of the frame, a housing enclosing all of the said members, so as to protect the said members from disturbing influences, electrostatic means proximate to the weight member, means to conduct an electric potential to the weight member, and means to conduct an electric potential to the electrostatic conduct means, the weight member being a non-conductor of electricity and being coated with an electrical conductor and placed in electrical connection with the aforesaid conducting means, thereby permitting the establishment of an electrostatic force between the electrostatic means and the weight member, making possible the comparison of the electrostatic force with the force of gravity.

4. In an apparatus for the measurement of gravity, a forked frame having prongs, a torsion fiber stretched between the prongs of the said frame, a weight member mounted upon the said fiber so as to be responsive to the force of gravity and the elastic force due to the fiber, the fiber being rigidly attached to each prong of the frame, a housing enclosing all of the said members, so as to protect the said members from disturbing influences, means to level the said housing, and means to indicate the degree of level of the said housing, means providing a horizontal axis of rotation for the forked frame, the said axis being substantially perpendicular to the direction of the torsion fiber, and means independent of the leveling means, operable from the exterior of the housing, and serving to alter the inclination of the forked frame by a desired small increment, thereby permitting the adjustment of sensitivity of the system from the exterior of the housing, without disturbance of the level of the apparatus.

5. In an apparatus of the type described, a measuring system requiring protection against temperature changes, an insulating enclosure surrounding the said system, and provided with temperature sensitive and temperature controlling means, adapted to compensate for small temperature differences so as to control the temperature within the said enclosure to fine limits, an outer insulating enclosure enclosing the first-named enclosure provided with an entirely independent temperature responsive element and temperature control system, adapted to compensate for relatively large changes in temperature due to external conditions, serving further to maintain the exterior of the inner enclosure at a constant temperature within coarse limits, the aforesaid assemblage being mounted as a portable unitary structure, to permit the maintenance of accurately controlled temperatures in the field, under conditions where large external changes in temperature are encountered.

6. In an apparatus for the measurement of gravity, a weight member, electrostatic means proximate to the weight member and adapted to exert a definitely known electrostatic force thereon, a plurality of standard cells, each having a definitely known electromotive force, switching means to connect a desired number of the standard cells so that their accurately known voltage will be applied to the electrostatic means and cause a definitely determinable electrostatic force upon the weight member, the standard cells being applied so as to be on open circuit, and without any current draining element across their terminals, thereby permitting the accurate comparison of the known electromotive force of the standard cells with the value of the force of gravity.

SHELLEY KRASNOW.